United States Patent Office 3,544,680
Patented Dec. 1, 1970

3,544,680
INTRANASAL IMMUNIZATION AGAINST RUBELLA
Stanley A. Plotkin, Philadelphia, Pa., assignor to The Wistar Institute, Philadelphia, Pa., a nonprofit corporation of Pennsylvania
No Drawing. Filed Oct. 9, 1968, Ser. No. 766,324
Int. Cl. A61k 27/00
U.S. Cl. 424—89      2 Claims

ABSTRACT OF THE DISCLOSURE

A rubella vaccine, prepared by passaging rubella virus at least 18 times in human diploid lung fibroblasts, is described as being effective in inducing immunity when administered intranasally.

---

This invention relates to a method of inducing immunity to rubella virus and to the vaccine adapted for said use. In particular, the invention relates to a method of producing immunity to rubella virus by administering a rubella vaccine intranasally.

Intranasal rubella vaccination offers advantages over subcutaneous administration both in terms of safety and ease of administration. It is useful in mass vaccination, particularly in its readier acceptance by an apprehensive subject. Another possible advantage is that vaccination by the natural rather than the parenteral route of infection may provide better local, nasal immunity to reinfection.

Although in natural infections, rubella virus multiplies in the nose and throat, and attenuated rubella viruses administered parenterally also localize in the nasopharynx, previous reports of attempts to use other rubella vaccines intranasally have resulted in failure; the Cendehill vaccine, grown in primary rabbit kidney cells, does not infect intranasally [Amer. J. Dis. Child. 115, 658 (1968)], nor does the HPV–77 vaccine, grown in primary African green monkey kidney [PAHO, Scientific Publication, 147, 390 (1967)].

I have succeeded in intransasally inducing immunity to rubella by using a vaccine in which the rubella virus has been attenuated through passage in human diploid lung fibroblasts (WI–38). The WI–38 fibroblasts were originally derived from a single human lung; they are pedigreed in the sense that they have been extensively characterized biologically, biochemically, virologically, and genetically. This cell line is standardized, in contrast to conventionally used primary animal cells. It has been described in Exper. Cell Res. 25, 585 (1961) and has been deposited with the American Type Culture Collection and assigned the designation ATCC CCL–75. It has been made available to many laboratories and may be freely obtained from the collection by anyone. The use of this cell line for the propagation of the virus minimizes the likelihood of latent animal viruses being transmitted to a vaccinee by means of the vaccine.

In preparing the vaccine to be used in the present invention, the virus strain is passaged in WI–38 fibroblasts by terminal dilution at progressively lower incubation temperatures until the virus is attenuated to such a degree that virus excretion and spread of disease to contacts are eliminated or minimized, while the capacity for achieving immunization is retained. It has been found that greater than 18, and up to at least 30, preferably 21 to 27, passages is the optimum number needed to achieve the desired attenuation.

Rubella virus which is to be used in preparing the vaccine may be obtained from an infected human fetus or from a typical clinical case by means of throat swabs, urine, or gargle samples. The samples are either frozen immediately and maintained at −60° until used or immediately inoculated into the tissue culture system.

Propagation of the human diploid lung fibroblasts may be carried out by any of the standard methods described in the literature. Specific examples of such propagation techniques are disclosed in Exper. Cell Res. 25, 585 (1961) and Virology 16, 147 (1962). The tissue culture system usually comprises Eagle's basal medium in Earle's balanced salt solution, supplemented with calf serum and containing a sterilizing amount of an antibiotic such as penicillin, streptomycin, chlortetracycline, or other antibiotic, or mixtures thereof, the system being buffered at a pH of about 6.8–8.5 with a conventional biological buffering agent such as an alkali metal bicarbonate, carbonate, or hydrogen phosphate.

The rubella virus is cultivated for vaccine use by inoculating the human diploid lung fibroblasts with virus harvested from the fetal tissue or with virus from the previous passage in the case of subsequent passages. Each incubation proceeds for a period of 14 days and is conducted at a temperature of about 30–35°. When the desired number of passages have been conducted, the harvested virus is subjected to standard sterility tests for the presence of bacteria, fungi, mycoplasma, and other contaminating agents.

The virus is utilized as a vaccine by filtering the harvested material in order to remove cells or bacteria, and the filtrate is either used as is, frozen for later use, or lyophilized and subsequently reconstituted with a solvent such as water.

The invention, in addition to including the method of inducing immunity to rubella through intranasal administration, also encompasses the rubella vaccine when prepared by the described process, adapted for intranasal administration.

The vaccine may be so adapted using a variety of appropriate means. Most simply, it can be placed in a dropper. It may also be placed in a plastic or other squeeze bottle suitable for use in orally administering a liquid into the nose. For this purpose, it can be dissolved in sterile water or sterile isotonic solution.

One desirable form of administration is an aerosol preparation. The vaccine may be combined with Freon or other inert propellant in an amount sufficient to yield the proper dosage. An example of such a propellant is a mixture of equal amounts of Freon 114 and Freon 12. Freon 114 is 1,2-dichlorotetrafluoroethane; Freon 12 is dichlorodifluoromethane. Other Freons or propellants suitable for intranasal application which do not adversely affect the antigenicity of the vaccine may be used.

The following description of the preparation and testing of the rubella vaccine is intended to illustrate the invention, but is not to be construed as limiting its scope.

PROCEDURE FOR OBTAINING VIRUS

The rubella virus used was obtained from an aborted rubella-infected human fetus. The 25 year-old mother was exposed to rubella eight weeks after the last menstrual period. A macular rash and lymphadenopathy developed 16 days after exposure, and rubella virus was isolated from her nasopharynx on the second day of rash.

The fetus was surgically aborted 17 days after the maternal illness and dissected immediately. Explants from several organs were cultured and successful cell growth was achieved from lung, skin, and kidney. All cell strains were found to be carrying rubella. The nutrient medium used for tissue culture of the virus was Eagle's basal medium (BME) with 10% calf serum added when cell growth was desired. Double strength of amino acids and vitamins was incorporated into the medium for culture of expeants. The concentration of antibiotics in each ml. of medium was 100 μg. of penicillin, 40 μg. of streptomycin, 50 μg. of chlortetracycline or 50 μg. of neomycin, and 20 μg. of nystatin. The organ explant technique used was that of Jensen et al., Exp. Cell Res. 34, 1296 (1963), in which bits of tissue are placed on metal grids at an air-nutrient medium interface.

PROCEDURE FOR PROPAGATING VIRUS

The harvest was inoculated on stationary WI-38 human diploid lung fibroblasts to initiate infection in these cells, and then subsequently passaged. Each passage was accomplished in the folowing manner: The undiluted virus from the previous passage, or a dilution of this virus, was inoculated on confluent monolayers of WI-38 human diploid lung fibroblasts (0.1 ml. of inoculum for each 17 cm.$^2$ of monolayer). After 1 hour adsorption, the cells were covered with BME and 10% fetal calf serum and incubated at 35° for passages 1-8, 33° for passages 9-13, 30° for passages 14-17, 35° for passage 18, 30° for passage 19, 35° for passage 20, 30° for passage 21, 30° for passages 22-24, 35° for passage 25, and 30° for passages 26 and 27. One week after incubation, the monolayers were treated with trypsin and subcultivated (12 days postinoculation), the BME with serum was removed, and the cells washed three times with BME containing no serum. BME without added serum was left in the bottles, and two days later (14 days postinoculation) the supernatant fluid was harvested for further passage or for test in man.

PROCEDURE FOR TESTING VACCINE

Each pool used for inoculation was subjected to tests for the presence of bacteria, fungi, and mycoplasma by inoculation onto appropriate artificial media. Tests for safety in animals included injection of aliquots of the pool into adult mice (intraperitoneally and intracerebrally), suckling mice (intraperitoneally and intracerebrally), guinea pigs (intraperitoneally), and rabbits (subcutaneously). All animals remained well for six weeks.

Further tests for identity and for the absence of contaminating agents were performed in tissue culture. Primary African green monkey kidney, human embryo kidney, primary rabbit kidney, and WI-38 cells all were inoculated with aliquots of virus, either directly or after neutralization for 1 hour at 37° with rabbit antirubella virus serum. There was no evidence of any agent other than rubella in the pool. Inoculations of HEp-2 were also made. Titration of pools for quantity of rubella virus was performed by plaquing on RK$_{13}$ cells.

RESULTS OF TESTING VACCINE IN HUMANS

The vaccine obtained from passage 27, strain RA 27/3, was tested for its ability to induce immunity by intranasal administartion in several studies. In each trial, full written informed consent of parents, guardians, and relevant authorities was obtained. All the children selected to be vaccinees or contacts were seronegative for rubella; only serologically positive nurses and attendants were allowed in contact with the children.

The vaccine was administered intranasally by means of a dropper which dropped 0.5 ml. (500 plaque-forming units [PFU]) into each nostril. During the administration and for one minute thereafter, the subjects remained supine. Subcutaneous administration of vaccine to other subjects for purposes of comparison was accomplished by injection of 0.5 ml. of vaccine over the deltoid muscle.

Nasopharyngeal swabs were collected in 1.5 ml. of Hanks' medium containing 0.25% gelatin, penicillin (100 units per ml.), streptomycin (100 μg. per ml.), and amphotericin B (40 μg. per ml.). In the laboratory, the fluids were inoculated into rabbit kidney (RK$_{13}$) and African green monkey (AGMK) cell cultures, 0.5 ml. being tested in each cell type. After incubation for 7 to 10 days, first-passage harvests from each cell type were inoculated into AGMK cultures for demonstration of interference. Agents that interfered with the cytopathogenicity of ECHO 11 were identified in neutralization tests against rubella antiserum as described by Plotkin, J. Amer. Med. Assoc. 190, 265 (1964).

Blood specimens for studies of viremia were collected with heparin. Leukocyte-rich palsma was obtained by gravity sedimentation of red cells and tested in a manner similar to that employed with swabs.

Virus in the vaccine lots was titrated by plaque formation in RK$_{13}$ cells as described by Plotkin, Arch. ges. virusforsch. 16, 423 (1965), and by interference titration in WI-38 cells as described by Plotkin et al., Amer. J. Eidemiol. 81, 71 (1965).

The neutralization and hemagglutination (HAI) tests were carried out according to protocols described by Plotkin, J. Amer. Med. Assoc. 190, 265 (1964).

In Trial A, 13 seronegative, mentally retarded children were given the RA27/3 vaccine, six subcutaneously (500 PFU) and seven intranasally (1000 PFU). Clinical reactions were absent in these children, except for one child in each group who developed palpable post-aricular lymph nodes; six weeks later all those inoculated subcutaneously and all but one of those inoculated intranasally had developed antibodies (Table I). The frequency of recovery of virus from the nasopharynx was not substantially different in the two groups, as shown in Table II (in which data from this trial and Trial D are combined).

TABLE I.—TRIALS OF INTRANASAL AND SUBCUTANEOUS VACCINATION OF SERO NEGATIVE SUBJECTS WITH RA27/3 RUBELLA VACCINE

| | Subcutaneous vaccination | | | Intranasal vaccination | | | Contacts, |
|---|---|---|---|---|---|---|---|
| Trial | No. serocon./ No. vacc.[1] | Post-vacc. HAI titers[1] | | No. serocon./ No. vacc.[1] | Post-vacc. HAI titers[1] | | No. serocon./ No. exposed[1] |
| | | Media[2] | Range[2] | | Median[2] | Range[2] | |
| A | 6/6 | 160 | 40-640 | 6/7 | 80 | 80-640 | |
| B | | | | 7/8 | 80 | 40-320 | 0/7 |
| C | 3/3 | 80 | 80-160 | 4/4 | 60 | 40-160 | |
| D | 5/5 | 160 | 40-160 | 4/6 | 160 | 160-320 | |
| E | 10/12 | 80 | 20-160 | 14/14 | 80 | 40-160 | 0/45 |

[1] Six weeks post-vaccination.
[2] Among those subjects who did develop antibodies.

TABLE II.—NASOPHARYNGEAL VIRUS EXCRETION AFTER INTRANASAL AND SUBCUTANEOUS INOCULATION OF RA27/3 VACCINE, 27th PASSAGE (TRIALS A AND D)

| | No. vaccinees excreting virus | | | | | | | | |
|---|---|---|---|---|---|---|---|---|---|
| | Days post-inoculation: | | | | | | | | |
| Type of vaccination | 0 | 3 | 7 | 9 | 11 | 13 | 14 | 17 | 21 |
| Subcutaneous | 0 | 0 | 0 | 1 | 5 | 4 | 2 | 1 | 0 |
| Intranasal * | 0 | 0 | 2 | 3 | 5 | 5 | 3 | 0 | 0 |

* Excludes 3 children who did not develop antibodies.

In Trial B, seven seronegative, orphaned children were given the vaccine intranasally (1000 PFU) and placed in contact with another seven unvaccinated seronegative children. A seronegative woman was also vaccinated intranasally. The adult and one of the vaccinated children developed enlarged post-auricular nodes during the second week after inoculation, but there were no other clinical reactions to the vaccine. On second bleeding nine weeks later, seven of the eight vaccinees, but none of the seven contacts, showed rubella antibodies in their sera (Table I).

In Trial C, the vaccinees were seven orthopedically handicapped children, aged 5 to 9 years. Three were given vaccine subcutaneously and four intranasally. A rash that did not resemble rubella was noted in one child vaccinated intranasally; however, this occurred 22 days post-inoculation, and β-hemolytic streptococci were isolated from her throat. She had no post-auricular nodes. The other vaccinees remained asymptomatic, but all vaccinees developed antibodies (Table I) with titers ranging from 1/40 to 1/160, with a median of 1/80.

In Trial D, retarded children 5 to 14 years of age were vaccinated, five subcutaneously and six intranasally. Two children vaccinated intranasally failed to servoconvert (Table I). It may be relevant that these retarded children, whose nares were encrusted with dried mucus, actively resisted intranasal administration of vaccine, and attempted to expel the nose drops.

There were no symptoms attributable to vaccination. Nasopharyngeal virus excretion data (Table II) showed only sporadic isolation of virus.

In Trials A and D, heparinized blood was obtained at an optimum time for detection of viremia (11 days post-vaccination); no rubella virus was recovered from these samples.

In Trial E, the vaccinees, 5 to 18 years of age, were deaf but otherwise normal. Vaccine was administered subcutaneously to 12 children and intranasally to 14 other children. Forty-five seronegative children served as contact controls.

Clinical observation showed post-auricular lymph node enlargement in four vaccinees, 12, 13, 16 and 18 years of age. The first three vaccinees were given vaccine intranasally; the 18-year-old (a girl), who was vaccinated subcutaneously, developed a rash 14 days after subcutaneous vaccination. None of the unvaccinated contact children developed rash or lymphadenopathy. Fever was not observed in any of the subjects.

Pharyngeal swabs were taken from the vaccinees 11 days after administration of the vaccine. Rubella virus was recovered from 2 of 12 children given vaccine subcutaneously, and three of 14 given vaccine intranasally.

Of the 12 subjects inoculated subcutaneously, 10 developed antibodies. It may be significant that the mothers of the two subjects who remained seronegative probably had had rubella during pregnancy. All 14 subjects given vaccine intranasally developed rubella antibodies (Table I.)

In Trial F, school girls, aged 5 to 18 years, and a 28-year-old teacher participated in a comparison of subcutaneous and intranasal vaccination. Seven subjects received vaccine subcutaneously, and six undiluted vaccine intranasally; five girls received a ½ dilution of vaccine equivalent to 500 PFU intranasally, eight girls were given a 1/10 dilution equivalent to 100 PFU, also intranasally. The total volume of liquid administered was 1 ml. at each dosage level. Two of the girls (both in the ½ dilution intranasal group) developed post-auricular lymphadenopathy, whereas the others remained asymptomatic. Because of the approach of the end of the school term, the second blood specimen had to be taken at 4 weeks, rather than 6 weeks post-vaccination. As seen in Table IV, 22 of the 26 girls developed antibodies, except for four in the group of eight given vaccine diluted 1/10. Thus, the 50% endpoint for intranasal vaccine administration was 100 PFU (Table III).

TABLE III.—TITRATION OF INTRANASAL VACCINE IN SERONEGATIVE SCHOOLGIRLS—TRIAL F

| Route of vaccination | Dose in PFU | No. seroconv./ No. vacc. | HAI titers post-vacc.[1] Median | Range |
|---|---|---|---|---|
| Subcutaneous | 500 | 7/7 | 40 | 20–80 |
| Intranasal | 1,000 | 6/6 | 40 | 40–160 |
| Do | 500 | 5/5 | 40 | 20–80 |
| Do | 100 | 4/8 | [2] (120) | [2] 40–320 |

[1] Four weeks.
[2] Only those subjects who responded with antibody.

Trial G involved the intranasal vaccination of seven retarded children, aged 8 to 10 years, with three others serving as susceptible controls. In the first part of the trial, the children were given 5000 PFU of the Cendehill rubella strain intranasally. This strain, attenuated by 51 passages in primary rabbit kidney tissue culture, is usually given subcutaneously. As shown in Table IV, six weeks after intranasal vaccination with Cendehill, only one of seven children had developed antibodies. At that time the RA27/3 vaccine (1000 PFU) was administered intranasally to the six remaining seronegative vaccinees. After another six weeks a third blood specimen was obtained which showed that all six vaccines had become seropositive. The three control children remained seronegative throughout the trials.

There were no clinical reactions following administration of either vaccine.

TABLE IV.—SEQUENTIAL INTRANASAL ADMINISTRATION OF CENDEHILL AND RA27/3 ATTENUATED RUBELLA VIRUSES—TRIAL G

| Time when specimen obtained | Individual HAI titers of vaccines | Contacts |
|---|---|---|
| Before administration of Cendehill Strain [1] | <10, <10, <10, <10, <10, <10, <10 | <10, <10, <10 |
| Six weeks after Cendehill, before RA27/3 [2] | 80, <10, <10, <10, <10, <10, <10 | <10, <10, <10 |
| Six weeks after RA27/3 | 40, 40, 160, 80, 40, 80, 80 | <10, <10, <10 |

[1] 51st passage, 5,000 PFU.
[2] 27th passage, 1,000 PFU.

DISCUSSION

The results achieved by intranasal administration of RA27/3 vaccine are summarized in Table V. Of 59 vaccinations, 55 (93%) resulted in development of antibodies with a median antibody titer of 1/80. This median titer is similar to that achieved with RA27/3 vaccine given subcutaneously. Three of the four failures to seroconvert after intranasal vaccination occurred in retarded children whose poor nasal hygiene and non-cooperation may have interfered with the successful introduction of nose drops.

TABLE V.—SUMMARY OF ANTIBODY RESPONSES TO INTRANASAL VACCINATION WITH 1,000 PFU OF RA27/3 RUBELLA VIRUS.

| Trial | Subjects | No. servocon/ No. vacc. |
|---|---|---|
| A | Retarded children | 6/8 |
| B | Pre-school children | 7/7 |
| C | School children | 4/4 |
| D | Retarded children | 4/6 |
| E | School children | 14/14 |
| F | Adolescents and children | [1] 11/11 |
| G | Retarded children | 6/6 |
| Misc. [2] | School children | 3/3 |
|  | All | 55/59 (93%) |

[1] Subjects who received 500 or 1,000 PFU.
[2] Miscellaneous subjects participating in family trials of rubella vaccine.

A dose of 500 to 1000 PFU is preferred for optimum intranasal vaccination. Doses as low as 100 PFU are also effective in inducing immunity, but 50% of the vaccines may fail to develop immunity.

Intranasal RA27/3 vaccination caused only occasional lymphadenopathy. One subject who was given subcutaneous vaccine did develop a rash. This subject was a 18-year-old girl; this may be important in view of the recent evidence that another attenuated rubella strain, HPV–77, caused arthralgia and arthritis in some adult women. The other subjects who received RA27/3 vaccine subcutaneously did not develop clinical reactions to the vaccine.

In Trials A, E, and G, despite the ability of the RA27/3 strain to infect intranasally, no spread to contacts occurred. This lack of contagiousness indicates a low degree of virus excretion.

In Trial E, two children, who presumably were deaf because of congenital rubella, failed to develop antibodies after subcutaneous vaccination. These children may have had an immunity which was not entirely serologic.

RA27/3 is singular among the previously known attenuated rubella strains for its ability to immunize by the nasal route. As shown in Trial G, the Cendehill strain given by the same route failed to immunize six of seven children; however, all of these children seroconverted when later given RA27/3 vaccine intranasally. As described above, both Cendehill and HPV–77 rubella vaccines have failed to infect intranasally in other studies.

I claim:

1. A method of inducing immunity to rubella comprising intranasally administering in sufficient quantity to produce antibodies without causing undesired symptoms of the disease a vaccine prepared by serially passaging at 30–35° a rubella virus strain 21 to 30 times in WI–38 human diploid lung fibroblasts, ATCC No. CCL–75.

2. A rubella vaccine, prepared as described in claim 1, adapted for intranasal administration.

References Cited

Cabasso et al.: J. Lab. & Clin. Med., vol. 70, pp. 429–441, September 1967.

Lee: Proc. Soc. Exptl. Biol. & Med. vol. 112, pp. 656–658, March 1963.

Plotkin et al.: Amer. J. Epidem., vol. 86, pp. 468–477, 1967.

RICHARD L. HUFF, Primary Examiner

U.S. Cl. X.R.

195—1.3